May 23, 1961 J. G. FISHER 2,985,020
OIL PRESSURE GAGE

Filed May 7, 1957 2 Sheets-Sheet 1

INVENTOR:
JOHN G. FISHER
BY O. O. Martin

ATTORNEY.

May 23, 1961 J. G. FISHER 2,985,020
OIL PRESSURE GAGE

Filed May 7, 1957 2 Sheets-Sheet 2

INVENTOR:
JOHN G. FISHER
BY
*O. Martin*

ATTORNEY.

United States Patent Office 2,985,020
Patented May 23, 1961

2,985,020
OIL PRESSURE GAGE
John G. Fisher, 805 19th St., Yuma, Ariz.
Filed May 7, 1957, Ser. No. 657,529
4 Claims. (Cl. 73—407)

This invention has relation to internal combustion engines and refers particularly to means for measuring and recording accumulations of impurities in the engine oil filtering system.

Most self-propelled vehicles, particularly trucks, tractors, boats and the like are equipped with filters in the engine lubricating system. A pump draws oil from the crank case sump of the engine and delivers the oil to the filter under pressure for return from the filter to the sump. The oil will during operations of the engine gradually absorb carbon and other foreign matter which will slow down and finally stop the flow of oil through the filter. It is for this reason found necessary periodically to remove the filter for checking and replacement by or before the time that complete saturation of the filter is reached.

If conditions remained uniform during operations of the engines, such checks would not be difficult to make. But temperature, load and speed variations as well as changes in the condition of the engines combine to render such checks almost impossible and much damage is frequently done to the engines.

It is in view of the foregoing the object of the present invention to provide means for facilitating checking of oil filters. Another object is to provide a device by means of which the condition of the filter may be checked at any time without having to disconnect or remove the filter from the oil system it serves.

These and other objects of the invention will appear upon perusal of the following detailed description and by referring to the accompanying drawings of which:

Figure 1:
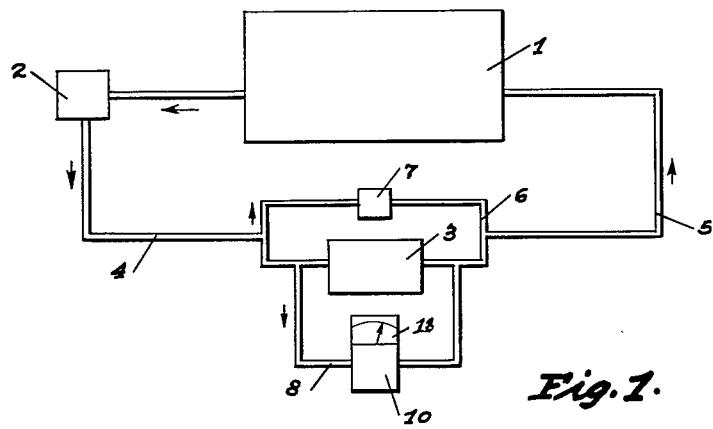
Fig. 1 illustrates schematically a conventional engine oiling system to which the device of the invention is applied.

In trucks, tractors, ditching, road grading and other self-propelled vehicles it is usually found that a pump 2 advances oil from the crank case sump of the engine 1 through a conduit 4 to the filter 3 and that a conduit 5 returns the filtered oil to the sump. It is also customary to interconnect the two conduits by means of a bypass conduit 6 in which a pressure actuated valve 7 is placed. This valve will, when the filter becomes clogged with carbon and other foreign matter, by pressure of the pump be opened to return unfiltered oil to the crank case sump. This, as above pointed out, is a very serious matter which may be overcome in the following manner.

Figure 2:
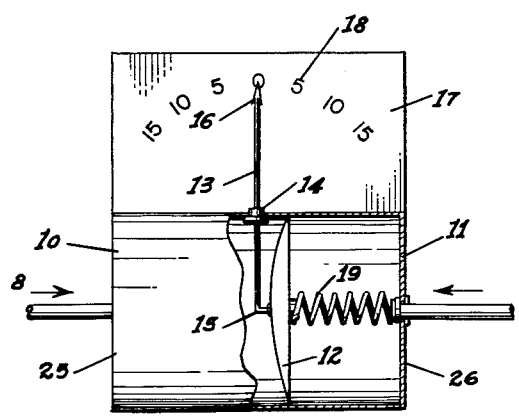
Fig. 2 is, on a larger scale, a separate view of the device of the invention.
Figure 3:
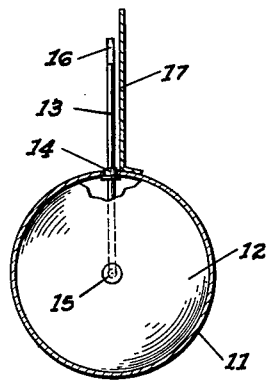
Fig. 3 is an end view of the device of Fig. 2.

An additional conduit 8 interconnects the conduits 4 and 5 and a pressure gage 10 is placed in this additional conduit. This gage consists of a cylindrical casing 11, see Figs. 2 and 3, within which a diaphragm 12 is placed. A rod 13 is at 14 shown pivotally mounted in the wall of the casing. One end, 15, of this rod is in any suitable manner fastened to the diaphragm at the center thereof and the rod extends upwardly terminating in a pointer or indicator 16. A plate 17 rises from the gage casing and it is at the upper end thereof fitted with a graduated scale 18 in concentric registration with the end of the pointer 16. A spring 19 normally maintains the diaphragm in the inactive position indicated in Fig. 2 and the pointer registers with the zero mark on the scale while the parts remain in this position.

As the sludge commences to accumulate within the filter it is found that pressure gradually will accumulate in front of the filter and the gage and this increasing pressure will commence to flex the diaphragm, against the tension of the spring 19, thereby to cause the pointer to advance along the scale correctly to indicate the degree of saturation within the filter. And when this indicating combination is placed in a convenient position, as for example on the dashboard of the vehicle, it is seen that the operator has the opportunity at all times, even while the vehicle is in operation, by a mere glance at the indicator, to check the condition of the filter. Replacement may be made when it is observed that saturation of the filter is reached. The spring will now return the diaphragm and pointer to normal zero position and normal flow through the new filter will be resumed.

Figure 4:
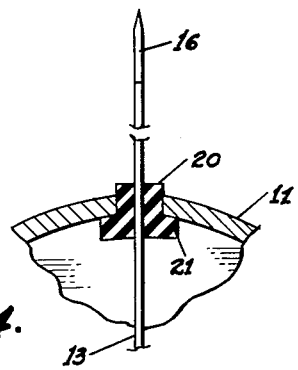
Figs. 4 and 5 show parts of Fig. 3.
Figure 5:
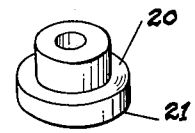

It becomes necessary so to mount the pointer in the casing wall that all danger of leakage is eliminated. Another matter to be considered is the vibrations the vehicle is subjected to during operations thereof. It becomes for these reasons necessary to mount the pointer in such manner that all danger of leakage and vibrational influence may be eliminated. This may be done in the following manner and as best illustrated in Figs. 4 and 5 of the drawings.

A soft rubber plug 20 is pushed in position on the indicator rod and then forced into the opening through the gage casing wall until the flange 21 of the plug seats tightly against the inner surface of the casing wall. The oil pressure within the casing will maintain this flange tightly pressed against the casing wall to eliminate all danger of leakage. And it is important to note that this soft rubber bearing, while substantially frictionless, is so vibration absorbing that the functioning of the indicator rod is not disturbed while the vehicle is in normal operation. It is to be understood that these parts as well as the diaphragm and spring must be placed in position before the end plates 25, 26 are mounted in position on the casing.

Figure 6:
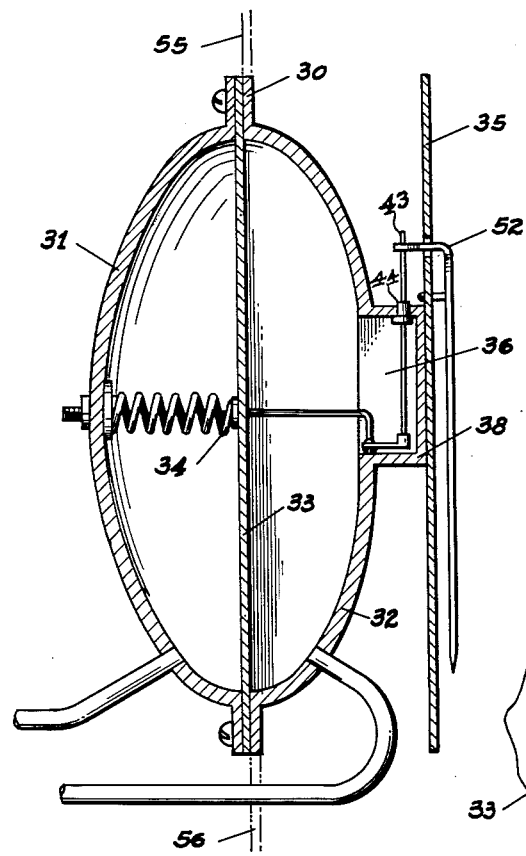
Figs. 6–8 illustrate a preferred form of the invention.
Figure 7:
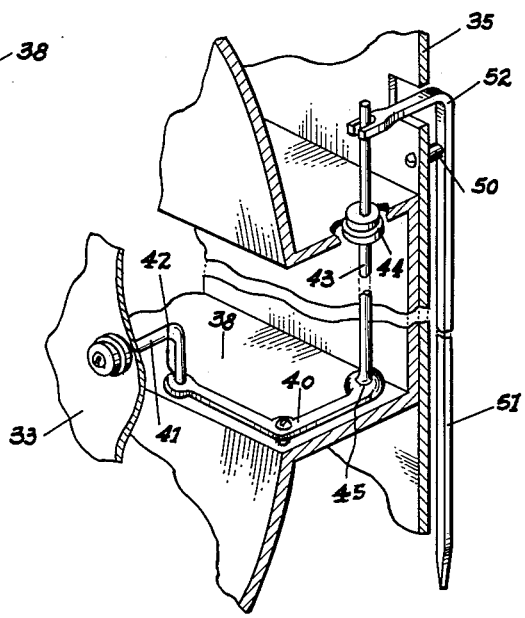
Figure 8:
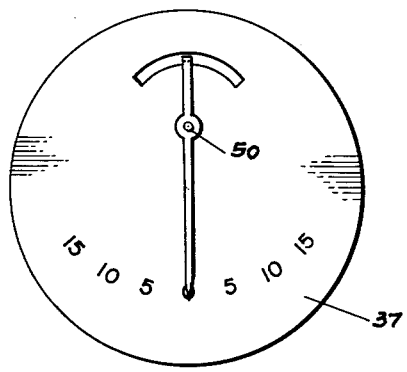

A preferred gage and indicator construction is in Figs. 6–8 shown to consist of a circular two-part casing 30, the walls 31, 32 of which are outwardly curved to provide space within the casing for the diaphragm 33, the spring 34 and the connections from the diaphragm to the indicator dial 35. A rectangular recess 36 is for this purpose sunk into the wall 32 and a dial 35 is secured in position on the outer surface of the recess wall. An L-shaped lever 40 is pivotally mounted on the horizontal bottom surface 38 of the recess. A stud 41 projects from the center of the diaphragm and the outer end of this stud is pivotally joined to one end of this lever, substantially as indicated at 42 in Fig. 7 of the drawings.

On a stud 50 of the dial is hung an indicator hand 51 the upper end of which is bent at right angles to form an arm 52 extending through a slot in the dial and the inner end of this arm is shown bifurcated fittingly to receive the upper end of a rod 43. A soft rubber plug 44, similar to the plug 20 of Fig. 4, is placed in the upper wall of the recess to receive the rod and firmly to maintain it in position. And the lower spherical end of the rod is fittingly seated within a socket 45 of the other end of the lever 40. Or, if preferred, a soft rubber plug, similar to the plug 20 may be mounted in the end of the lever to receive the rod 43 thereby further to assure vibrationless dial indications. One of the flanges of the gage casing may readily be extended, substantially as indicated in phantom outline in Fig. 6, to provide lugs 55, 56 by means of which the device may readily be mounted on the dashboard of the vehicle.

It is seen from the foregoing description that I have provided a very simple and inexpensive addition to the conventional filter assembly of an internal combustion engine by means of which the condition of the filter may be checked at any time by the operator of the vehicle from his steering wheel position on the vehicle. But the device of the invention possesses the additional advantage that the functioning of the oil pump may also be similarly checked. Should for some reason the pump fail to produce the required oil pressure, then the spring will commence to flex the diaphragm in the opposite direction. This will cause the indicator to swing to the other side of zero to give warning to the operator that checking of the pump or pump connections is necessary. This is an important feature of the invention.

I claim:

1. An oil pressure gage comprising, a circular casing made in two parts, a diaphragm seated between the two casing parts, conduits for oil under pressure leading into the casing on both sides of the diaphragm, a dial mounted on the casing in parallel relation to the diaphragm, a pointer mounted for oscillation in the side wall of the casing, and means for imparting oscillation from said diaphragm to said pointer in response to diaphragm flections, said means being connected to the center of said diaphragm and to said pointer, and extending through said casing, said means comprising a stud projecting from the center of the diaphragm, an L-shaped lever pivotally joined at one end thereof to the end of the stud, a rod uprightly mounted for oscillation in a bearing in an opening of the casing wall, the lower end of this rod being pivotally joined to the other end of the lever, a pointer mounted for swinging movement on the dial, the upper end of the pointer being bifurcated and bent at right angles firmly to engage the upper end of the rod.

2. A device as set forth in claim 1 in which the rod bearing consists of a soft resilient plug firmly encompassing the rod and tightly seated in the bearing opening of the casing to provide a frictionless vibration absorbing support for the rod.

3. A device as set forth in claim 2 in which the plug is made with a shoulder engaging the inner surface of the casing wall, oil pressure within the casing maintaining the shoulder tightly seated to insure a leakproof closure.

4. A pressure gage which includes: a casing; a flexible diaphragm mounted in said casing so as to divide said casing into two parts; conduit means for introducing fluid under pressure into said parts; indicator dial means mounted on the exterior of said casing; indicator means movably mounted with respect to said dial means, said indicator means being connected to said diaphragm within said casing by rod means extending through said casing, said rod means being a part of said indicator means, said indicator means including an L-shaped lever, the center of said lever being pivotally mounted at its center within said casing, means attached to said diaphragm engaging one end of said lever, and wherein said rod means is engaged with the other end of said lever, and including a pointer pivotally mounted on said dial, said pointer being connected to the extremity of said rod means located remote from said L-shaped lever on the exterior of said casing; and a soft resilient plug firmly engaging said rod means and engaging said casing around said rod means, said plug forming a seal with respect to said rod means and said casing and serving as a bearing providing a vibration absorbing support for said rod means.

References Cited in the file of this patent

UNITED STATES PATENTS

| | | |
|---|---|---|
| 663,979 | O'Brien | Dec. 18, 1900 |
| 750,752 | Cole | Jan. 26, 1904 |
| 1,658,067 | Wheeler | Feb. 7, 1928 |
| 1,662,529 | McKinley | Mar. 13, 1928 |
| 1,763,354 | Ileman | June 10, 1930 |
| 1,798,692 | Mapel | Mar. 31, 1931 |
| 2,367,087 | Beecher | Jan. 9, 1945 |
| 2,410,999 | Reisner | Nov. 12, 1946 |
| 2,809,520 | Richard | Oct. 15, 1957 |
| 2,843,077 | Leefer | July 15, 1958 |